(12) United States Patent
Tawara

(10) Patent No.: US 8,528,073 B2
(45) Date of Patent: Sep. 3, 2013

(54) STORAGE MEDIUM HAVING INFORMATION PROCESSING PROGRAM STORED THEREIN, INFORMATION PROCESSING APPARATUS, AND INFORMATION PROCESSING SYSTEM

(75) Inventor: Masaki Tawara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 402 days.

(21) Appl. No.: 12/651,063

(22) Filed: Dec. 31, 2009

(65) Prior Publication Data

US 2011/0107435 A1    May 5, 2011

(30) Foreign Application Priority Data

Oct. 29, 2009   (JP) .................................. 2009-248588

(51) Int. Cl.
*G06F 21/00*    (2013.01)

(52) U.S. Cl.
USPC .......................................................... 726/18

(58) Field of Classification Search
USPC ............................................................ 726/18
See application file for complete search history.

(56) References Cited

U.S. PATENT DOCUMENTS

2009/0228639 A1*   9/2009   Cho .............................. 711/103

FOREIGN PATENT DOCUMENTS

JP            2007-019897       *     1/2007

* cited by examiner

*Primary Examiner* — Jason Gee
(74) *Attorney, Agent, or Firm* — Nixon & Vanderhye, P.C.

(57) ABSTRACT

An information processing apparatus displays, on a display device, personal information including person-identifying information based on which a person can be identified and non-person-identifying information based on which a person cannot be identified. First, the information processing apparatus determines whether or not authentication of a user has succeeded based on an input by the user and authentication information stored in storage means of the information processing apparatus. Then, the information processing apparatus prohibits display of the person-identifying information of the personal information stored in the storage means when it is determined that authentication has failed.

13 Claims, 7 Drawing Sheets

SELECT ITEM TO BE VIEWED/EDITED

| BASIC INFORMATION |
| RECORD OF MEDICAL HISTORY |
| RECORD OF MEDICATION HISTORY |
| RECORD OF INFECTIOUS DISEASES/ VACCINATION |
| RECORD OF HUMAN DRY DOCKS |
| SELF EXAMINATION |

STORAGE MEDIUM HAVING INFORMATION PROCESSING PROGRAM STORED THEREIN, INFORMATION PROCESSING APPARATUS, AND INFORMATION PROCESSING SYSTEM

CROSS REFERENCE TO RELATED APPLICATION

The disclosure of Japanese Patent Application No. 2009-248588, filed Oct. 29, 2009, is incorporated herein by reference.

BACKGROUND OF THE INVENTION

1. Field of the Invention

The present invention relates to a storage medium having an information processing program stored therein, an information processing apparatus, and an information processing system and, more particularly, to a storage medium having stored therein an information processing program for managing personal information, an information processing apparatus therefor, and an information processing system therefor.

2. Description of the Background Art

Among conventional devices storing personal information that would reveal privacy if seen by a third person, there are devices known in the art that protect personal information by means of authentication information such as passwords (see, for example, Japanese Laid-Open Patent Publication No. 2007-019897 (Patent Document 1)). The portable terminal described in Patent Document 1 stores, as personal information to be managed, information of the conversion order of the predictive conversion dictionary, and authenticates a user using authentication information inputted by the user. The portable terminal prevents the personal information from being known to a third person by erasing the personal information when authentication fails.

With the portable terminal described in Patent Document 1, the personal information will be erased when authentication fails. That is, in order to use the erased personal information again, the user needs to re-input the personal information. For example, if the user forgets the password, the user will need to re-input the personal information which had been stored. As described above, there is a problem in the prior art in that the user needs to perform a time-consuming re-input operation when the user fails in authentication.

SUMMARY OF THE INVENTION

It is therefore an object of the present invention to provide a storage medium having an information processing program stored therein, an information processing apparatus and an information processing system, which are user-friendly and do not require the user to perform a time-consuming re-input operation even if the user fails in authentication.

The present invention has the following features (1) to (12) to attain the object mentioned above.

(1)

The present invention is a computer-readable storage medium storing therein an information processing program executed by a computer of an information processing apparatus for displaying, on a display device, personal information. The personal information includes person-identifying information based on which a person can be identified and non-person-identifying information based on which a person cannot be identified. The information processing program instructs the computer to function as authentication determination means, and information control means. The authentication determination means determines whether or not authentication of a user has succeeded based on an input by the user and authentication information stored in storage means accessible from the computer. The information control means prohibits display of the person-identifying information of the personal information stored in the storage means when it is determined by the authentication determination means that authentication has failed.

The "information processing apparatus" is not limited to the game apparatus described in the embodiment below, and is a concept including a computer for executing any computer program to perform an information process. The "information processing apparatus" may or may not be a portable type.

The "information processing program" is not limited to the physical information management program described in the embodiment below, and is a concept including an application program executed by a personal computer or a portable terminal.

The "person-identifying information" is information regarding a person, and information based on which it is possible to identify the person. The "person-identifying information" is not limited to the information of name and face photograph described in the embodiment below, and is a concept including address, email address, driver's license number, health insurance number, etc.

The "non-person-identifying information" is information regarding a person, and is information based on which it is not possible to identify the person. The "non-person-identifying information" is information that will pose problems such as the invasion of privacy of the person when it is made public to a third person while it can be identified as being information of that particular person, and is a concept at least including the following information.

Physical information (information regarding the body or health of a person, e.g., information of height, weight, waist, medical history, medication history, allergies, etc.)

Assets information (information regarding assets of a person, e.g., information of bankbook, household accounts book, property, income, etc.)

Personal history information (information regarding the personal history/career of a person, e.g., information of vocational history, educational history, medical history, grades at school, etc., diary, etc.)

Vocational information (information regarding the occupation of a person, e.g., information of salary, vocational history, etc.)

Schedule information (information regarding the schedule of a person, e.g., information of schedule sheet)

Likings information (information regarding the hobbies/likings of a person, e.g., information of hobbies, favorite music/movies, list of regular stores, etc.)

The "authentication determination means" is means for authenticating a valid user. The authentication determination means is not limited to means for performing authentication using a password as authentication information (steps S5 to S7) as in the embodiment below, and is a concept including means for performing biometric authentication using biometric information such as fingerprint, vein, iris, etc., as authentication information.

The "user" is a user of the information processing apparatus or the information processing program. Particularly, where a single information processing apparatus is used by a plurality of persons, the "user" is a user of the information processing program. Note that a person identified by the "person-identifying information" does not always need to coincide with the "user". For example, there may be cases where a mother, being the user, uses the present information processing program for managing information regarding her child.

The "storage means accessible from the computer" may be storage means (memory) that is provided in the information processing apparatus including the computer, such as the saved data memory 34 of the embodiment below, storage means (storage medium) that can be attached/detached to/from the information processing apparatus, such as the memory card 28 or 29 of the embodiment below, or storage means provided in an external unit that can communicate with the information processing apparatus.

The "information control means" is means for prohibiting display of person-identifying information when authentication of a user fails. Note that the method for prohibiting display of person-identifying information may be any method, and may be a method in which the person-identifying information is erased from the storage means (step S8) as in (2) below and the embodiment below, or a method in which the person-identifying information is kept stored while only prohibiting display of the person-identifying information.

With configuration (1) above, display of the person-identifying information is prohibited when authentication has failed. Therefore, an invalid user who has failed in authentication may be able to view non-person-identifying information but cannot view person-identifying information, which will not pose a problem because the invalid user cannot identify of whom the non-person-identifying information is. With the configuration (1) above, even if authentication fails, the non-person-identifying information is saved, and the user will not need to re-input the non-person-identifying information. That is, even in a case where a valid user fails in authentication for reasons such as forgetting the password, it is not necessary to perform a time-consuming operation of re-inputting the non-person-identifying information, thus providing a user-friendly application. As described above, according to the present invention, it is possible to provide an information processing program that is safe and has a high usability.

(2)

The information control means may prohibit display of the person-identifying information by erasing the person-identifying information of the personal information from the storage means, when it is determined that authentication has failed.

With the configuration (2) above, the person-identifying information is erased from the storage means when authentication fails, and it is therefore possible to reliably prevent the person-identifying information from being viewed by an invalid user.

(3)

The information processing program may instruct the computer to further function as first storage control means. The first storage control means accepts an input of new person-identifying information and stores the new person-identifying information in the storage means, when it is determined that authentication has failed.

The "first storage control means" may be any means as long as it can store new person-identifying information, and may be means for storing authentication information in addition to person-identifying information as in (5) below, or means for storing part of non-person-identifying information in addition to person-identifying information (step S9) as in the embodiment below.

With the configuration (3) above, it is possible to re-input person-identifying information when authentication fails. Therefore, in a case where a valid user fails in authentication for reasons such as forgetting the password, it is possible to restore the personal information to what it was originally and to normally use the information processing program, by re-inputting person-identifying information.

(4)

The information control means may erase the authentication information from the storage means, when it is determined that authentication has failed.

With the configuration (4) above, the authentication information is erased when authentication fails, and it is therefore possible to reliably prevent the authentication information from being viewed by an invalid user.

(5)

The first storage control means may accept an input of new authentication information and store the new authentication information in the storage means, when it is determined that authentication has failed.

In the configuration (5), to "accept an input of new authentication information" may be a process of accepting a birth date as the authentication information as in step S12 in step S9 of the embodiment below, or a process of accepting an arbitrary character string set by the user as the authentication information.

With the configuration (5) above, it is possible to re-input authentication information when authentication fails. Where the authentication information is a password, for example, there may be cases where a valid user fails in authentication for reasons such as forgetting the password. With the configuration (5) above, in such a case, a valid user can re-input a new password, and can use the new password for authentication instead of the old, forgotten password.

(6)

The information processing program may instruct the computer to further function as first display control means. The first display control means displays the new person-identifying information and the non-person-identifying information, when the new person-identifying information is stored in the storage means.

With the configuration (6) above, even in a case where authentication fails, the user can re-input person-identifying information, and the user can view the new person-identifying information and the original non-person-identifying information. Therefore, even in a case where a valid user fails in authentication for reasons such as forgetting the password, the user can restore personal information to what it was originally to normally use the information processing program, by re-inputting person-identifying information.

(7)

The information processing program may instruct the computer to further function as second storage control means. The second storage control means has the user input the person-identifying information and the authentication information at an initial start-up of the information processing program and stores the inputted person-identifying information and the inputted authentication information in the storage means.

The "second storage control means" may be any means as long as it can store at least person-identifying information and authentication information, and may be means for storing part of non-person-identifying information in addition to person-identifying information and authentication information (step S2) as in the embodiment below.

With the configuration (7) above, person-identifying information and authentication information are set at an initial start-up of the information processing program. At an initial start-up, it is likely that the information processing program is being started up by a valid user. Thus, with the configuration (7) above, it is possible to reliably set person-identifying information and authentication information of a valid user.

(8)

The information processing program may instruct the computer to further function as input accepting means. The input accepting means accepts an input of authentication information when the information processing program is started up after person-identifying information and authentication information are stored in the storage means by the storage control means. The authentication determination means determines whether or not authentication has succeeded based on the authentication information accepted by the input accepting means and the authentication information stored in the storage means.

The "input accepting means" may be means for accepting an input of a password as in the embodiment below, and may be means for accepting an input of biometric information such as fingerprint, vein or iris, where the authentication determination means performs biometric authentication.

With the configuration (8) above, user authentication is performed after person-identifying information and authentication information are set. Therefore, it is possible to prevent, through authentication, an invalid user from viewing the person-identifying information, thus reliably protecting the personal information.

(9)

The information processing program may instruct the computer to further function as editing means. The editing means edits non-person-identifying information stored in the storage means when it is determined by the authentication determination means that authentication has succeeded.

The "editing means" may be any means as long as it can edit at least non-person-identifying information, and may be means for editing person-identifying information and authentication information in addition to non-person-identifying information (step S3) as in the embodiment below. "Editing" refers to at least one of adding, changing and deleting.

With the configuration (9) above, non-person-identifying information can be edited when authentication succeeds after person-identifying information and authentication information are set. Therefore, since only a valid user can edit the non-person-identifying information, it is possible to reliably protect the personal information.

(10)

The information processing program may instruct the computer to further function as second display control means. The second display control means displays person-identifying information and non-person-identifying information stored in the storage means when it is determined that authentication has succeeded.

The "second display control means" may be any means as long as it can display person-identifying information and non-person-identifying information, and may display person-identifying information and non-person-identifying information at the same time (on a single screen) (FIG. 8), or may display person-identifying information and non-person-identifying information at different points in time.

With the configuration (10) above, the user can view personal information when authentication succeeds. Therefore, since only a valid user can view the personal information, it is possible to reliably protect the personal information.

The present invention may also be provided in the form of an information processing apparatus that is similar in function to the information processing apparatus having functions of the various means described above. Note that in such an information processing apparatus, the various means may be implemented by a CPU executing the information processing program described above, or some or all of the various means may be implemented by a dedicated circuit or circuits of the information processing apparatus.

(12)

The present invention may also be provided in the form of an information processing system that has functions of the various means described above and that includes a terminal unit and a server unit. That is, the present invention may be provided in the form of an information processing system, including a terminal unit for displaying, on a display device, personal information including person-identifying information based on which a person can be identified and non-person-identifying information based on which a person cannot be identified, and a server unit that can communicate with the terminal unit via a network. The information processing system includes personal information storing means, authentication information storing means, the authentication determination means, and the information control means. The personal information storing means stores the personal information. The authentication information storing means stores the authentication information. Note that some of the various means of the information processing system may be provided in the terminal unit with the other means provided in the server unit, wherein each means may be provided either on the terminal unit side or in the server unit.

Also with the configurations (11) and (12) above, it is possible to provide an information processing program that is safe and has a high usability, as with the configuration (1) above.

According to the present invention, since display of person-identifying information is prohibited when authentication fails, there is no problem even if non-person-identifying information is seen by a third person. Moreover, since it is not necessary to re-input non-person-identifying information, it is possible to provide an information processing program that is safe and has a high usability.

These and other objects, features, aspects and advantages of the present invention will become more apparent from the following detailed description of the present invention when taken in conjunction with the accompanying drawings.

DESCRIPTION OF THE PREFERRED EMBODIMENTS

[Hardware configuration of Game Apparatus]

Figure 1:
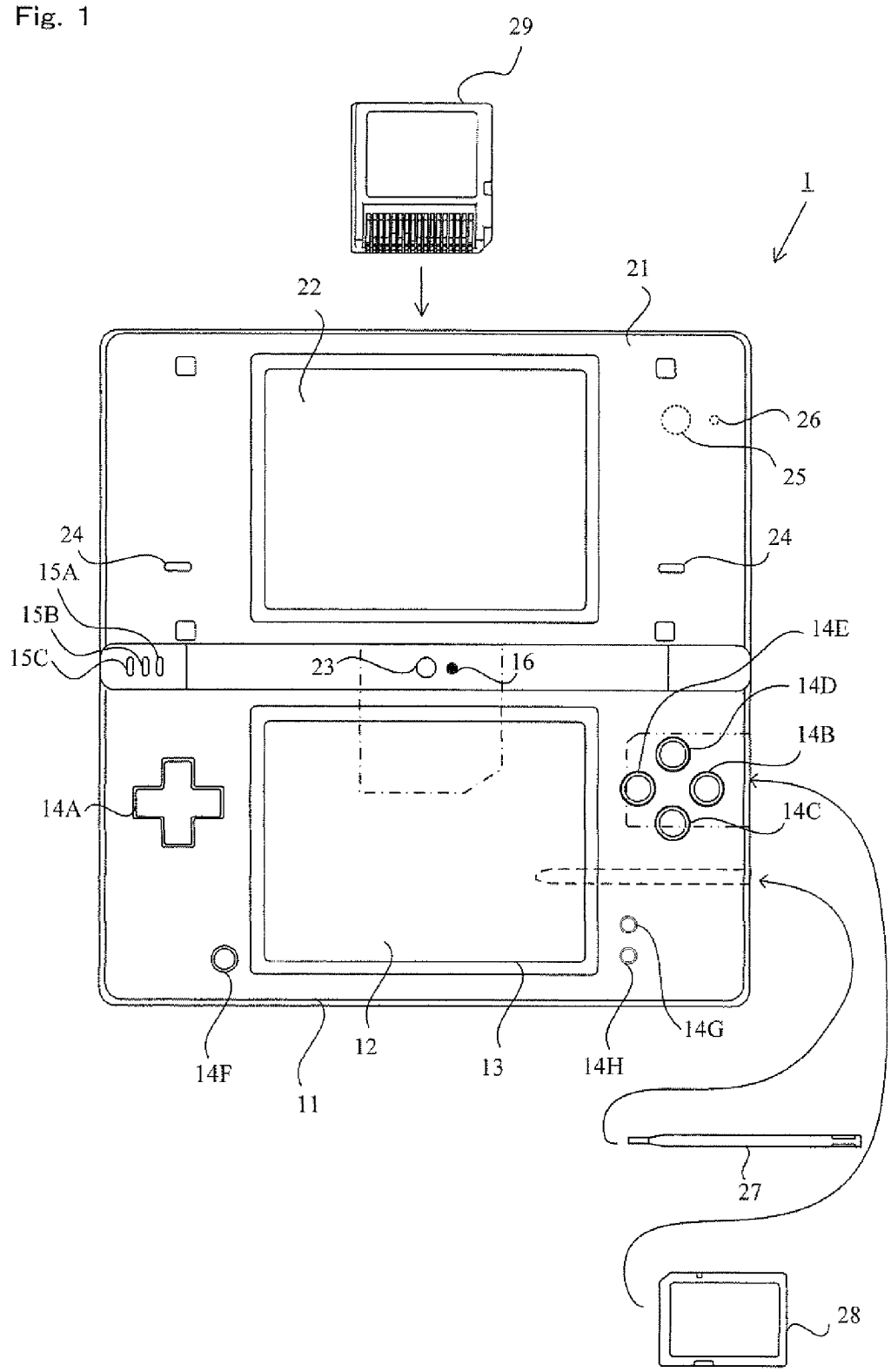
FIG. 1 is an external view of a game apparatus for executing a game program according to an embodiment of the present invention.

Referring to the drawings, an information processing program and an information processing apparatus according to one embodiment of the present invention will be described. While the present invention is carried out by executing the present information processing program by any information processing apparatus storing personal information, the present embodiment is directed to a case where a game apparatus 1 shown in FIG. 1 is used as an example of the information processing apparatus.

FIG. 1 is an external view of the game apparatus 1 for executing an information processing program according to the present embodiment. Here, a hand-held game apparatus is shown as an example of the game apparatus 1. Note that the game apparatus 1 includes a camera and functions as an imaging device for taking an image with the camera, displaying the taken image on the screen, and storing data for the taken image.

In FIG. 1, the game apparatus 1 is a foldable hand-held game apparatus, and the game apparatus 1 shown in the figure is unfolded (open state). The game apparatus 1 is structured in a size allowing the user to hold it with both hands, or even one hand, when unfolded.

The game apparatus 1 has a lower housing 11 and an upper housing 21. The lower housing 11 and the upper housing 21 are connected so as to be openable/closable (foldable). In the example of FIG. 1, the lower housing 11 and the upper housing 21 are each formed in the shape of a horizontally elongated rectangular plate, and connected so as to be pivotable at their common long side joint. Typically, the user uses the game apparatus 1 in open state. Also, when the user does not use the game apparatus 1, the game apparatus 1 is stored in closed state. In addition, in the example shown in FIG. 1, the game apparatus 1 can maintain not only the closed and open states but also its opening state via friction force generated at the joint at any angle that can be made by the lower housing 11 and the upper housing 21 between the closed and open states. That is, the upper housing 21 can remain stationary at an arbitrary angle with respect to the lower housing 11.

The lower housing 11 is provided with a lower LCD (Liquid Crystal Display) 12. The lower LCD 12 is horizontally long, and is arranged such that its longitudinal direction coincides with the longitudinal direction of the lower housing 11. Note that in the present embodiment, LCDs are used as display devices to be included in the game apparatus 1, but any other display devices, such as EL (Electro Luminescence) display devices, may be used. In addition, display devices of any resolution can be used for the game apparatus 1. Note that an image being taken by an internal camera 23 or an external camera 25 is displayed in real-time on lower LCD 12.

The lower housing 11 is provided with various operation buttons 14A to 14K and a touch panel 13 as input devices. As shown in FIG. 1, of all the operation buttons 14A to 14K, the direction input button 14A, the operation button 14B, the operation button 14C, the operation button 14D, the operation button 14E, the power button 14F, the start button 14G, and the select button 14H are provided at the inner principal surface of the lower housing 11. The inner principal surface is a surface to be the interior side when the upper housing 21 and the lower housing 11 are folded. In the example shown in FIG. 1, the direction input button 14A and the power button 14F are provided to the left or right (in FIG. 1, to the left) of the lower LCD 12 provided at the center of the inner principal surface of the lower housing 11. In addition, the operation buttons 14B to 14E, the start button 14G, and the select button 14H are provided to the opposite side (in FIG. 1, to the right) of the lower LCD 12 on the inner principal surface of the lower housing 11. The direction input button 14A, the operation buttons 14B to 14E, the start button 14G, and the select button 14H are used for various operations on the game apparatus 1.

For example, the direction input button 14A is used for selection operations and so on. The operation buttons 14B to 14E are used for setting and cancellation operations and so on. The power button 14F is used for turning ON/OFF the game apparatus 1.

Note that in FIG. 1, the operation buttons 14I to 14K are not shown. For example, the L button 14I is provided at the left edge of the upper surface of the lower housing 11, and the 8 button 14J is provided at the right edge of the upper surface of the lower housing 11. For example, the L button 14I and the 8 button 14J are used for imaging instruction operations (shutter operations) on the game apparatus 1 having an imaging function. Furthermore, the volume button 14K is provided at the left side surface of the lower housing 11. The volume button 14K is used for controlling the volume of a speaker included in the game apparatus 1.

Also, in addition to the operation buttons 14A to 14K, the game apparatus 1 further includes a touch panel 13 as an example of a pointing device that is an input device allowing designation an arbitrary position on the screen. The touch panel 13 is attached so as to cover the screen of the lower LCD 12. Note that in the present embodiment, a touch panel 13 is, for example, of a resistive film type. However, a touch panel 13 is not limited to the resistive film type, and may be of any type. Also, in the present embodiment, for example, the touch panel 13 has the same resolution (detection accuracy) as the lower LCD 12. However, the touch panel 13 is not necessarily required to be equal in resolution to the lower LCD 12. In addition, the lower housing 11 has an insertion opening (in FIG. 1, indicated by broken lines) provided in its right side surface. The insertion opening can store a touch pen 27 to be used for operating the touch panel 13. Note that any input to the touch panel 13 (touch input) is normally performed with the touch pen 27, but the touch pen 27 is not restrictive, and the touch panel 13 can be operated with the user's finger.

Also, the lower housing 11 has provided in the right side surface an insertion opening (in FIG. 1, indicated by two-dot chain lines) for storing a memory card 28. The insertion opening has provided therein a connector (not shown) for electrically connecting the game apparatus 1 and the memory card 28. The memory card 28 is, for example, an SD (Secure Digital) memory card removably attached to the connector. For example, the memory card 28 is used for storing (saving) images taken by the game apparatus 1 and reading into the game apparatus 1 images generated by other apparatuses.

Furthermore, the lower housing 11 has provided in its upper side surface an insertion opening (in FIG. 1, indicated by one-dot chain lines) for storing a memory card 29. This insertion opening also has provided therein a connector (not shown) for electrically connecting the game apparatus 1 and the memory card 29. The memory card 29 is a storage medium having an information processing program such as a game program stored therein, and is removably loaded into the insertion opening provided in the lower housing 11.

Three LEDs 15A to 15C are provided to the left of the joint between the lower housing 11 and the upper housing 21. Here, the game apparatus 1 is capable of wirelessly communicating with other equipment, and the first LED 15A is lit up while the game apparatus 1 is ON. The second LED 15B is lit up while the game apparatus 1 is being charged. The third LED 15C is lit up when wireless communication is established. Accordingly, the three LEDs 15A to 15C allow the user to know the statuses of the game apparatus 1, regarding ON/OFF of the power supply, battery charge, and communications.

On the other hand, the upper housing 21 is provided with an upper LCD 22. The upper LCD 22 is horizontally long, and is arranged such that its longitudinal direction coincides with the longitudinal direction of the upper housing 12. Note that as in the case of the lower LCD 12, any display device of any other type and resolution may be used instead of the upper LCD 22. Note that a touch panel may be provided over the upper LCD 22. The upper LCD 22 displays, for example, an operation instruction screen for teaching the user about the roles of the operation buttons 14A to 14K and the touch panel 13.

Also, the upper housing 21 is provided with two cameras (an internal camera 23 and an external camera 25). As shown in FIG. 1, an internal camera 23 is provided at the inner principal surface close to the joint of the upper housing 21. On the other hand, the external camera 25 is provided opposite to the side of the inner principal surface where the internal camera 23 is provided, i.e., the external principal surface of the upper housing 21 (the exterior surface of the game apparatus 1 in closed state; the back of the upper housing 21 shown in FIG. 1). Note that in FIG. 1 the external camera 25 is indicated by a broken circle. As a result, the internal camera 23 can take images of the direction in which the inner principal surface of the upper housing 21 is oriented, while the external camera 25 can take images of the direction opposite to the imaging direction of the internal camera 23, i.e., the direction in which the external principal surface of the upper housing 21 is oriented. In this manner, in the present embodiment, the two cameras, i.e., the internal and external cameras 23 and 25, are provided so as to take images in their respective directions opposite to each other. For example, the user can use the internal camera 23 to take images of a view from the game apparatus 1 toward the user, and also can use the external camera 25 to take images of a view in the opposite direction, i.e., from the user toward the game apparatus 1.

Note that a microphone (microphone 43 shown in FIG. 2) is provided as an audio input device under the inner principal surface close to the joint. In addition, a microphone hole 16 is provided in the inner principal surface close to the joint such that the microphone 43 can sense sound from outside the game apparatus 1. The microphone 43 and the microphone hole 16 are not necessarily required to be positioned at the joint. For example, the microphone 43 may be accommodated within the lower housing 11, and the microphone hole 16 may be provided in the lower housing 11 at a position corresponding to the position where the microphone 43 is accommodated.

Also, a fourth LED 26 (in FIG. 1, indicated by a broken circle) is provided at the external principal surface of the upper housing 21. The fourth LED 26 is lit up at the time the internal camera 23 or the external camera 25 takes an image (when the shutter button is pressed). Furthermore, the light is on while the internal camera 23 or the external camera 25 is taking a motion picture. As such, the fourth LED 26 allows any subject and bystander to know the game apparatus 1 took (or is taking) a picture.

Also, a sound hole 24 is provided to both the left and the right of the upper LCD 22 provided at the center of the inner principal surface of the upper housing 21. A speaker is accommodated within the upper housing 21 below each sound hole 24. The sound hole 24 is a hole for emanating the sound from the speaker to the outside of the game apparatus 1.

As described above, the upper housing 21 is provided with the internal and external cameras 23 and 25 configured to take images, as well as the upper LCD 22 acting as a display means for mainly displaying the operation instruction screen. On the other hand, the lower housing 11 is provided with the input devices (the touch panel 13 and the operation buttons 14A to 14K) for operational inputs to the game apparatus if and the lower LCD 12 acting as a display means for displaying taken images. Accordingly, when using the game apparatus 1, the user can see a taken image (an image taken by the camera) displayed on the lower LCD 12 and make inputs via the input devices while holding the lower housing 11.

Figure 2:
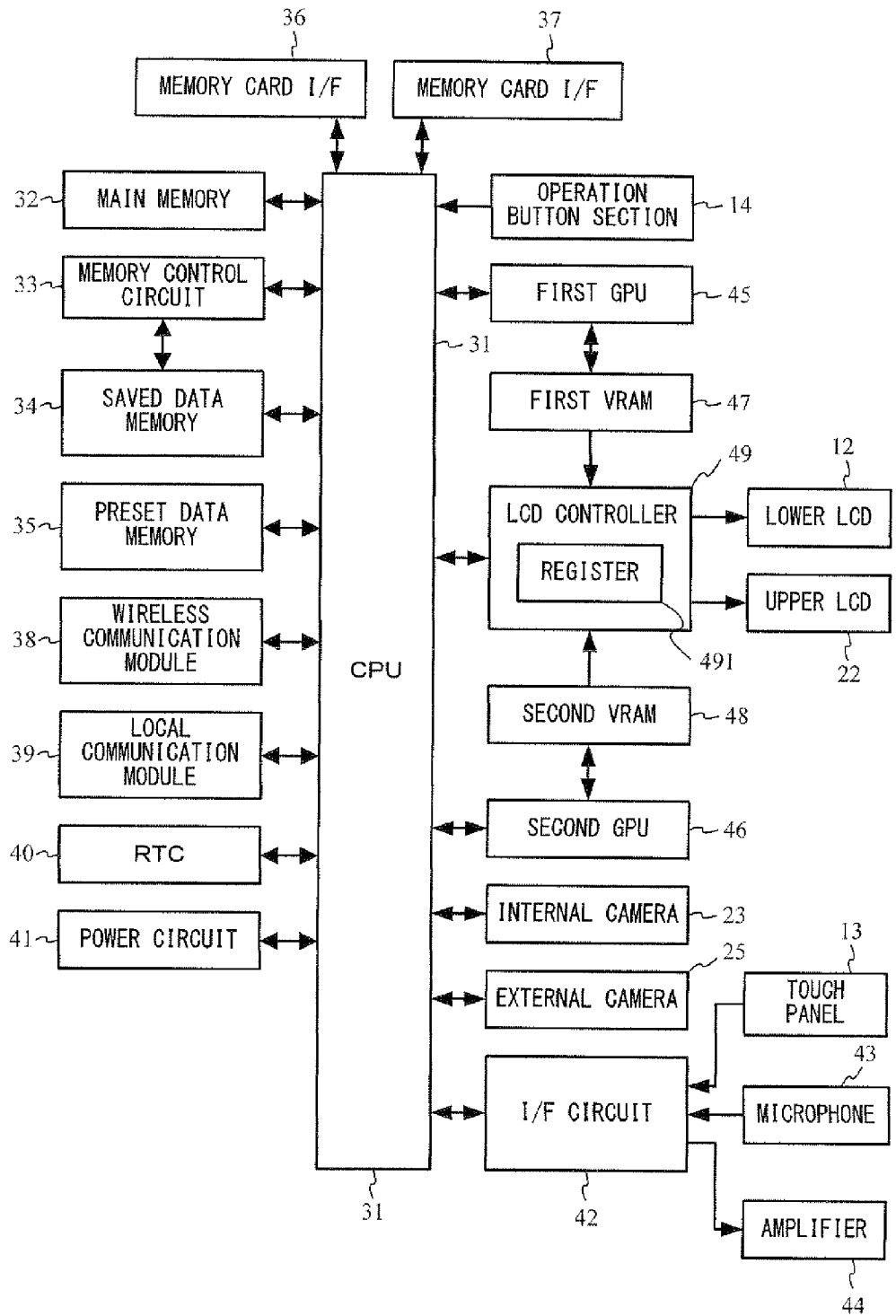
FIG. 2 is a block diagram illustrating an exemplary internal configuration of the game apparatus.

Next, an internal configuration of the game apparatus 1 will be described with reference to FIG. 2. FIG. 2 is a block diagram illustrating an exemplary internal configuration of the game apparatus 1.

In FIG. 2, the game apparatus 1 includes electronic parts, such as a CPU 31, a main memory 32, a memory control circuit 33, a saved data memory 34, a preset data memory 35, a memory card interface (memory card I/F) 36, a memory card I/F 37, a wireless communication module 38, a local communication module 39, a real time clock (RTC) 40, a power circuit 41, an interface circuit (I/F circuit) 42, a first CPU (Graphics Processing Unit) 45, a second GPU 46, a first VRAM (Video RAM) 47, a second VRAM 48, and an LCD controller 49. These electronic parts are mounted on an electronic circuit board, and accommodated within the lower housing 11 (or may be accommodated within the upper housing 21).

The CPU 31 is an information processing means for executing a predetermined program (here, a game program according to the present embodiment). In the present embodiment, the game program is stored in a memory (e.g., saved data memory 34) within the game apparatus 1 as well as in the memory card 28 and/or 29, and the CPU 31 executes the game program, thereby executing a game process to be described later. Note that the program to be executed by the CPU 31 may be prestored in the memory within the game apparatus 1 or may be acquired from the memory card 28 and/or 29 or from other equipment through communication therewith.

The CPU 31 is connected to the main memory 32, the memory control circuit 33, and the preset data memory 35. The memory control circuit 33 is connected to the saved data memory 34. The main memory 32 is a storage means used as a working area or buffering area for the CPU 31. Specifically, a main memory 32 stores various data to be used in the game process, and programs acquired from outside (e.g., the memory cards 28 and 29 and other equipment). In the present embodiment, for example, a PSRAM (Pseudo-SRAM) is used as the main memory 32. The saved data memory 34 is a storage means for storing, for example, the programs to be executed by the CPU 31 and data for images taken by the internal camera 23 and the external camera 25. The saved data memory 34 is configured by a nonvolatile storage medium, e.g., in the present embodiment, a NAND flash memory. The memory control circuit 33 is a circuit for controlling data reading from/writing to the saved data memory 34 in accordance with an instruction by the CPU 31. The preset data memory 35 is a storage means for storing data (preset data) such as various present parameters for the game apparatus 1. As for the preset data memory 35, a flash memory connected to the CPU 31 via an SPI (Serial Peripheral Interface) bus can be used.

The memory card I/Fs 36 and 37 are each connected to the CPU 31. The memory card I/F 36 reads/writes data from/to the memory card 28 attached to the connector in accordance with an instruction from the CPU 31. Also, the memory card I/F 37 reads/writes data from/to the memory card 29 attached to the connector in accordance with an instruction from the CPU 31. In the present embodiment, image data taken by the internal camera 23 and the external camera 25, as well as image data received from other devices are written into the memory card 28, and image data stored in the memory card 28 is read from the memory card 28 and stored to the saved data memory 34 or transmitted to other devices. In addition, various programs stored in the memory card 29 are read and executed by the CPU 31.

Note that the game program of the present invention may be supplied to a computer system not only via an external storage medium, such as the memory card 29, but also via a wired or wireless communication line. Also, the game program may be pre-recorded to a nonvolatile storage device within the computer system. Note that the information storage medium for storing the game program is not limited to the nonvolatile storage device, and may be a CD-ROM, a DVD, or a similar optical disk storage medium.

The wireless communication module 38 has a function of connecting to a wireless LAN in accordance with a system complying with, for example, the IEEE802.11.b/g standard. Also, the local communication module 39 has a function of wirelessly communicating with similar game apparatuses in accordance with a predetermined communication system. The wireless communication module 38 and the local communication module 39 are connected to the CPU 31. The CPU 31 is capable of transmitting/receiving data to/from other equipment via the Internet using the wireless communication module 38, as well as transmitting/receiving data to/from other similar game apparatuses via the Internet using the local communication module 39.

The CPU 31 is also connected to the RTC 40 and the power circuit 41. The RTC 40 counts time and provides an output to the CPU 31. For example, the CPU 31 can calculate the current time (date) based on the time counted by the RTC 40. The power circuit 41 controls power supplied from the power supply (typically, a battery accommodated in the lower housing 11) provided in the game apparatus 1, and supplies power to various parts of the game apparatus 1.

The game apparatus 1 is also provided with the microphone 43 and an amplifier 44. The microphone 43 and the amplifier 44 are each connected to the I/F circuit 42. The microphone 43 senses the voice of the user speaking to the game apparatus 1, and outputs an audio signal representing the voice to the I/F circuit 42. The amplifier 44 amplifies the audio signal from the I/F circuit 42 to provide an output from the speaker (not shown). The I/F circuit 42 is connected to the CPU 31.

Also, the touch panel 13 is connected to the I/F circuit 42. The I/F circuit 42 includes an audio control circuit for controlling the microphone 43 and the amplifier 44 (speaker), and a touch panel control circuit for controlling the touch panel 13. The audio control circuit performs A/D conversion and D/A conversion on the audio signal, and also converts the audio signal into audio data of a predetermined format. The touch panel control circuit generates touch position data (detected coordinate data to be described later) of a predetermined format based on a signal from the touch panel 13, and outputs the generated data to the CPU 31. The touch position data is data representing coordinates of a position detected by the touch panel 13 as being the position at which an input was made to the input screen of the touch panel 13. Note that the touch panel control circuit performs reading of a signal from the touch panel 13 and generation of detected coordinate data once every predetermined period of time.

The above-described operation buttons 14A to 14K constitute an operation button section 14 connected to the CPU 31. The operation button section 14 outputs to the CPU 31 operation data representing the status of input to the operation buttons 14A to 14K (whether or not the buttons have been pressed). The CPU 31 acquires the operation data from the operation button section 14, and executes a process in accordance with an input to the operation button section 14.

The internal camera 23 and the external camera 25 are each connected to the CPU 31. The internal camera 23 and the external camera 25 each take an image in accordance with an instruction from the CPU 31, and output data for the taken image to the CPU 31. In the present embodiment, the CPU 31 instructs either the internal camera 23 or the external camera 25 to perform imaging, and the camera instructed to perform imaging takes an image and transmits image data to the CPU 31.

The first GPU 45 is connected to the first VRAM 47, and the second GPU 46 is connected to the second VRAM 48. In accordance with an instruction from the CPU 31, the first GPU 45 generates a first display image based on display image generation data stored in the main memory 32, and creates an image on the first VRAM 47. In accordance with an instruction from the CPU 31, the second GPU 46 generates a second display image, and creates an image on the second VRAM 48, as in the case of the first GPU 45. The first VRAM 47 and the second VRAM 48 are connected to the LCD controller 49.

The LCD controller 49 includes a register 491. The register 491 stores the value of 0 or 1 in accordance with an instruction from the CPU 31. When the value in the register 491 is 0, the LCD controller 49 outputs the first display image created on the first VRAM 47 to the lower LCD 12, and also outputs the second display image created on the second VRAM 48 to the upper LCD 22. Alternatively, when the value in the register 491 is 1, the LCD controller 49 outputs the first display image created on the first VRAM 47 to the upper LCD 22, and also outputs the second display image created on the second VRAM 48 to the lower LCD 12. For example, the CPU 31 is capable of causing the lower LCD 12 to display an image acquired from either the internal camera 23 or the external camera 25, while causing the upper LCD 22 to display an operation instruction screen generated by a predetermined process.

[Process Executed by Information Processing Program]

Next, referring to FIGS. 3 to 8, the process executed by the information processing program of the present embodiment will be described. The present information processing program is a physical information management program for managing the physical information of the user. Herein, the physical information refers to a concept including information regarding the body or health of the user, e.g., information such as height, weight, waist, medical history, medication history and allergies. The physical information management program is an application for storing the physical information and viewing the physical information as necessary, and serves as a health handbook.

As described above, the present information processing program is for storing/managing personal information of the user. Herein, the personal information refers to information (of any kind) regarding the individual, and information included in the personal information can be classified into person-identifying information and non-person-identifying information. The person-identifying information is information regarding a person based on which it is possible to identify the person. For example, name, address, email address, driver's license number, health insurance number, face photograph, etc., are person-identifying information. On the other hand, the non-person-identifying information is information regarding a person based on which it is not possible to identify the person. For example, the physical information such as height/weight and medical history are non-person-identifying information. Since a person cannot be identified solely by non-person-identifying information, it does not pose a significant problem even if the information becomes known. However, it poses a problem if non-person-identifying information becomes known while being paired with person-identifying information, in which case it is known that the non-person-identifying information is information regarding a particular person. Therefore, in the present embodiment, the game apparatus 1 manages personal information including person-identifying information and non-person-identifying information so that the non-person-identifying information is prevented from becoming known while being paired with the person-identifying information. Details of the process executed by the game apparatus 1 with the information processing program (physical information management program) will now be described in detail.

Figure 3:
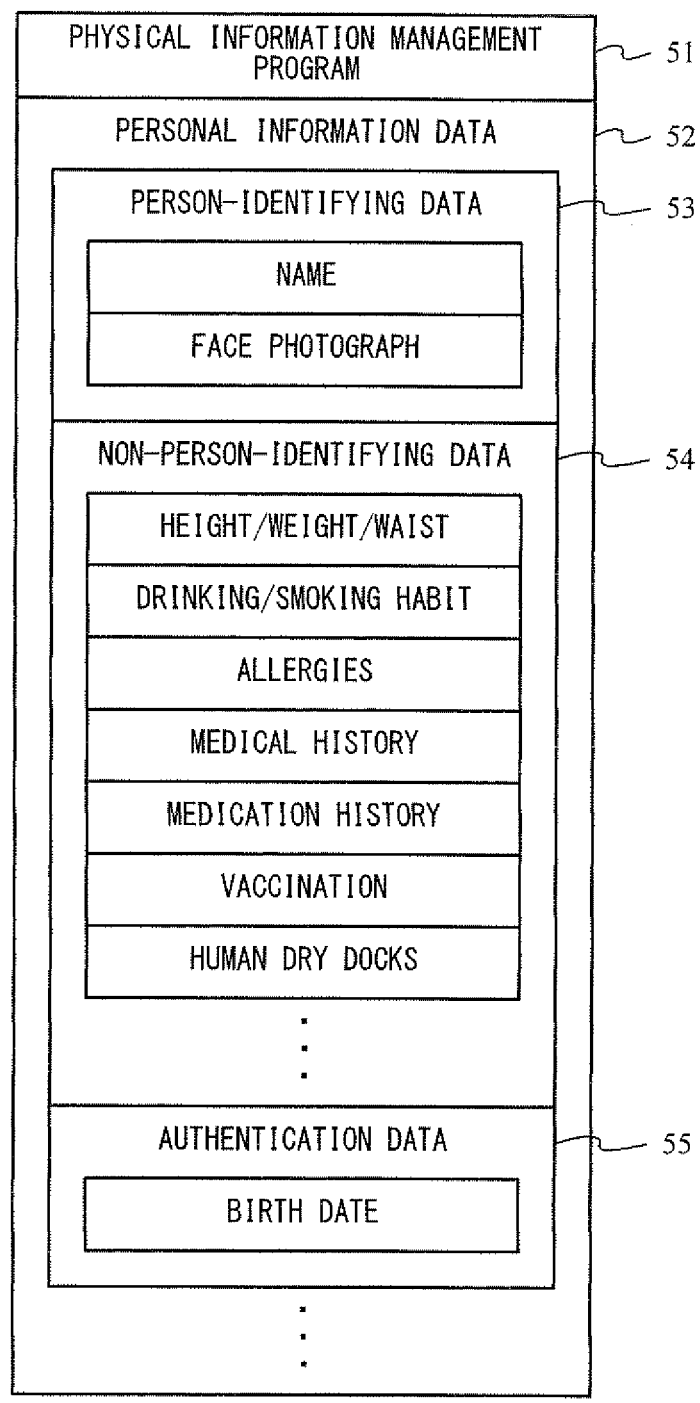
FIG. 3 shows various data used in a process performed by a physical information management program.

FIG. 3 shows various data used in a process performed by the physical information management program. In FIG. 3, a saved data memory 34 stores a physical information management program 51 of the present embodiment and personal information data 52. Note that while the saved data memory 34 in the game apparatus 1 is used as a storage medium for saving the physical information management program 51 and the personal information data 52 in the present embodiment, the physical information management program 51 and/or the personal information data 52 may be saved in a memory card 28 or 29 in other embodiments.

The physical information management program 51 is a program for instructing the CPU 31 of the game apparatus 1 to execute a physical information management process (FIG. 4) to be described later. The physical information management program 51 is obtained in advance from an external device via the Internet by using a wireless communication module 38, and is stored in the saved data memory 34. If the physical information management program 51 is provided as being recorded on the memory card 29 in other embodiments, the physical information management program 51 is stored in the main memory 32 as it is read from the memory card 29 at an appropriate timing.

The personal information data 52 is data representing personal information to be managed by the physical information management process (FIG. 4) to be described later. The personal information data 52 includes person-identifying data 53, non-person-identifying data 54, and authentication data 55. The personal information data 52 is not stored in the saved data memory 34 before the physical information management program 51 is initially started up, and is stored through the registration process (step S2 to be described later), the editing process (step S22 to be described later), etc., executed after the startup.

The person-identifying data 53 is data representing the person-identifying information. In the present embodiment, information representing the user's name and face photograph is stored as the person-identifying information. Note that in other embodiments, the person-identifying information may be address, email address, driver's license number, health insurance number, or the like, and may be any information based on which the person can be identified.

The non-person-identifying data 54 is data representing the non-person-identifying information. In the present embodiment, the physical information described above is stored as the non-person-identifying information. Specifically, the physical information includes information regarding height/weight/waist, drinking/smoking habit, allergies, medical history, medication history, vaccination, human dry docks, etc. Information regarding drinking/smoking habit refers to information of the drinking frequency (e.g., once per week), the amount of drinking per day, the frequency of smoking or the amount of smoke per day. Information regarding allergies is information of the kinds and degrees of allergies that the user has, etc. Information regarding medical history is information regarding diseases that the user is (was) having currently or in the past, indicating the name of disease, whether it has been healed, whether the user is/was hospitalized, etc. Information regarding medication history is information regarding drugs that the user is (was) taking currently or in the past, indicating the name of medicine, dosage period, dosage method/dose, side effects, etc. Information regarding vaccination is information indicating names of vaccines that the user has received, names and periods of infectious diseases that the user has had, etc. Information regarding human dry docks is information of the diagnostic results of human dry docks (or medical checkups) that the user has had. As described above, in the present embodiment, the user can manage various information regarding body/health by the physical information management program.

The authentication data 55 represents authentication information used in an authentication process (step S5 to be described later) for determining whether or not the user attempting to use the physical information management program (the game apparatus 1) is a valid user. In the present embodiment, the authentication data 55 is data of a password. More specifically, in the present embodiment, the birth date information, which the user can easily remember, is used as a password, taking into consideration that the range of the users of the physical information management program will include elderly people, etc. In other embodiments, however, a password used in the authentication process is not limited to the user's birth date but may be a character string freely set by the user. The authentication method in the authentication process is not limited to a password-based method, but if, for example, the terminal (the game apparatus 1) has a function capable of identifying biometric information such as fingerprint, vein or iris, the method may be a method based on biometric authentication using such biometric information. Then, the authentication data 55 is data representing biometric information of a valid user.

Figure 4:
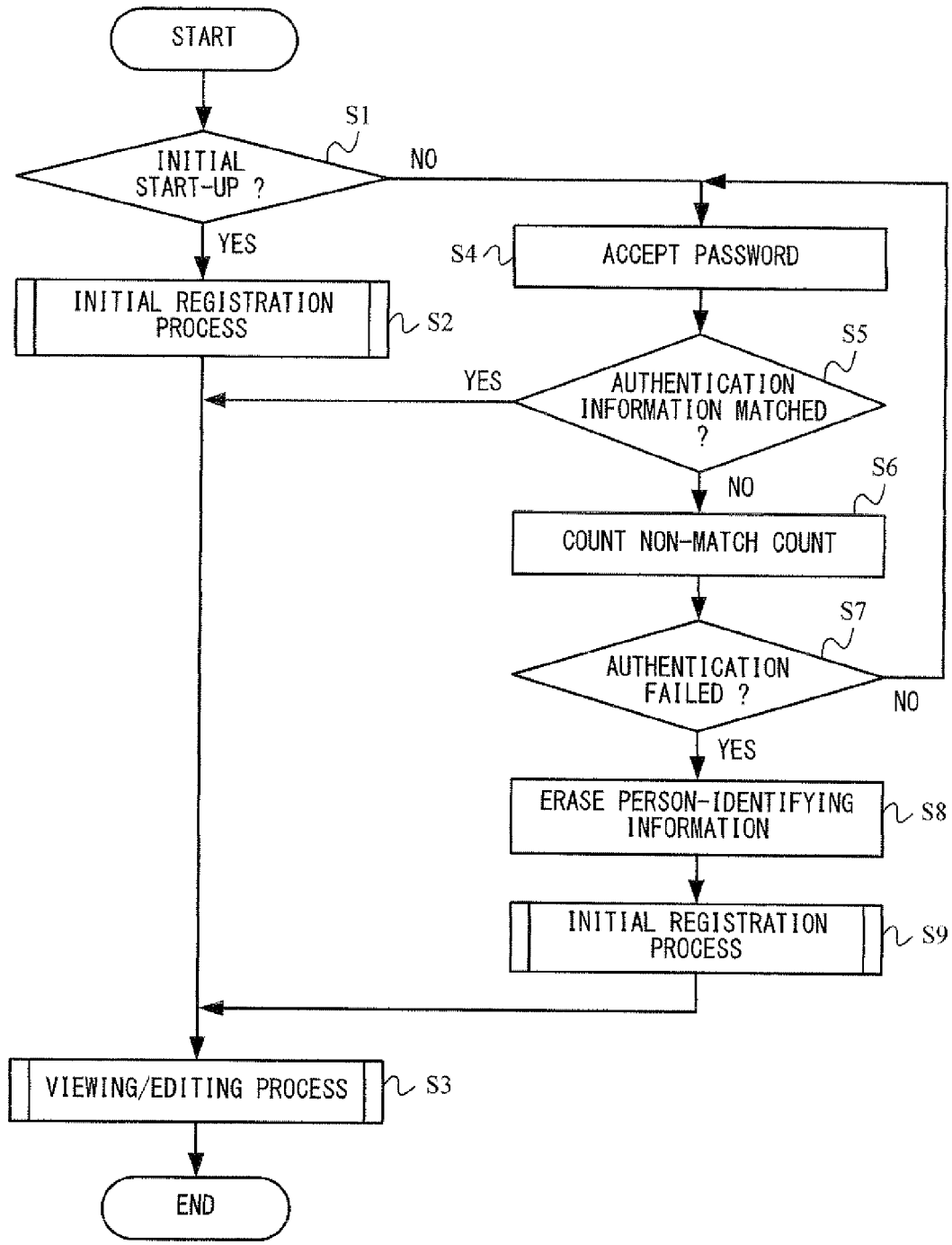
FIG. 4 is a main flow chart showing the flow of a game process executed by a game apparatus 1.

Next, the details of the physical information management process performed by the game apparatus 1 will be described with reference to FIGS. 4 to 8. FIG. 4 is a main flow chart of a game process executed by the game apparatus 1. As the power button 14F is pressed down to turn ON the power of the game apparatus 1, the CPU 31 of the game apparatus 1 displays a menu screen (e.g., an image including images (icons) representing various applications) by which the start-up of various applications is instructed. On the menu screen, the user makes an instruction to start up the physical information management program 51, e.g., an instruction of selecting an icon of the physical information management program 51. When there is an instruction on the menu screen to start up the physical information management program 51, the CPU 31 initializes the main memory 32, etc., and then starts executing the physical information management program 51 for performing the process shown in FIG. 4. In the present embodiment, as the physical information management program 51 is executed, the CPU 31 functions as various means set forth in the claims. That is, the physical information management program 51 instructs the CPU 31 to function as various means set forth in the claims.

First, in step S1, the CPU 31 determines whether or not the start-up of the physical information management program 51 stored in the saved data memory 34 is the initial (first) start-up. The determination can be made by, for example, storing data (flag) indicating whether or not the start-up is the initial start-up in the saved data memory 34 in advance, and referring to the contents of the data. If the determination result of step S1 is affirmative, the process of step S2 is executed. On the other hand, if the determination result of step S1 is negative, the process of step S4 to be described later is executed.

In step S2, the CPU 31 executes an initial registration process. In the initial registration process, the person-identifying information, the authentication information and part of the non-person-identifying information are set by the user and stored. Now, referring to FIG. 5, the details of the initial registration process of step S2 will be described.

Figure 5:
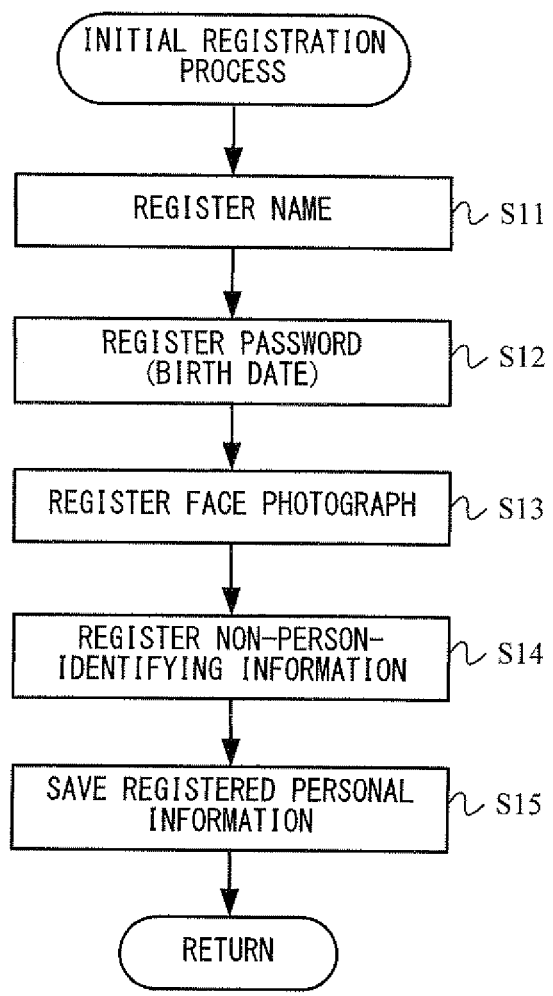
FIG. 5 is a flow chart showing the flow of an initial registration process (step S2) shown in FIG. 4.

FIG. 5 is a flow chart showing the flow of the initial registration process (step S2) shown in FIG. 4. In the initial registration process, first in step S11, the CPU 31 has the user register the name. Specifically, the CPU 31 displays "Input your name", or the like, to thereby prompt the user to input the name and accepts the input of the name from the user. Note that in the present embodiment, the method for having the user make an input may be any method, and may be, for example, a method in which the user is allowed to write letters using the touch panel 13 or a method in which the user is allowed to select letters displayed on the screen. When the user inputs the name, the CPU 31 stores data representing the inputted name in the main memory 32. Following step S11, the process of step S12 is executed.

In step S12, the CPU 31 has the user register a password. As described above, in the present embodiment, the CPU 31 has the user register the birth date as the password. Specifically, the CPU 31 displays "Input your birth date", or the like, to thereby prompt the user to input the birth date and accepts the input of the birth date from the user. When the user inputs the birth date, the CPU 31 stores data representing the inputted birth date in the main memory 32. Following step S12, the process of step S13 is executed.

In step S13, the CPU 31 instructs the user to register the face photograph. Specifically, the CPU 31 starts up the internal camera 23, and displays an image captured by the internal camera 23. Then, it is preferred that there is a display on the screen that prompts the user to take a photograph, such as "Take your face photograph". As the user performs an imaging instruction operation (e.g., presses down the L button 14I or the R button 14J), the CPU 31 stores the image data of the face photograph taken by the internal camera 23 in the main memory 32. Following step S13, the process of step S14 is executed.

In step S14, the CPU 31 has the user register part of the non-person-identifying information (physical information). The process of step S14 is a process for having the user register, in the first registration process, some of the user's physical information that are basic. Specifically, the CPU 31 accepts inputs from the user of information regarding height, weight, waist, allergies, drinking/smoking habit (hereinafter referred to as basic information). Then, as the basic information is inputted, the CPU 31 stores the data representing the basic information in the main memory 32. Following step S14, the process of step S15 is executed.

In step S15, the CPU 31 saves (stores) the personal information registered in steps S11 to S14 in the saved data memory 34. That is, the CPU 31 saves the data representing the name and the face photograph data, stored in the main memory 32, in the saved data memory 34 as the person-identifying data 53. The CPU 31 saves the data representing the birth date, stored in the main memory 32, in the saved data memory 34 as the authentication data 55. The CPU 31 saves the data representing the basic information, stored in the main memory 32, in the saved data memory 34 as the non-person-identifying data 54. After step S15, the CPU 31 ends the initial registration process.

By the initial registration process described above, information of the name and the face photograph of the user is registered as person-identifying information, information of the birth date of the user as authentication information, and the basic information as non-person-identifying information. Note that in other embodiments, information registered as person-identifying information may be only information of the name, or information such as address, email address, driver's license number and health insurance number may be registered in addition to the information of the name or instead of the information of the name). In the initial registration process, the game apparatus 1 does not always need to perform the registration of non-person-identifying information.

Referring back to FIG. 4, following the initial registration process of step S2, the viewing/editing process of step S3 is executed. The viewing/editing process is a process for allowing the user to view and edit the personal information stored in the saved data memory 34. Now, referring to FIG. 6, the details of the viewing/editing process of step S3 will be described.

Figure 6:
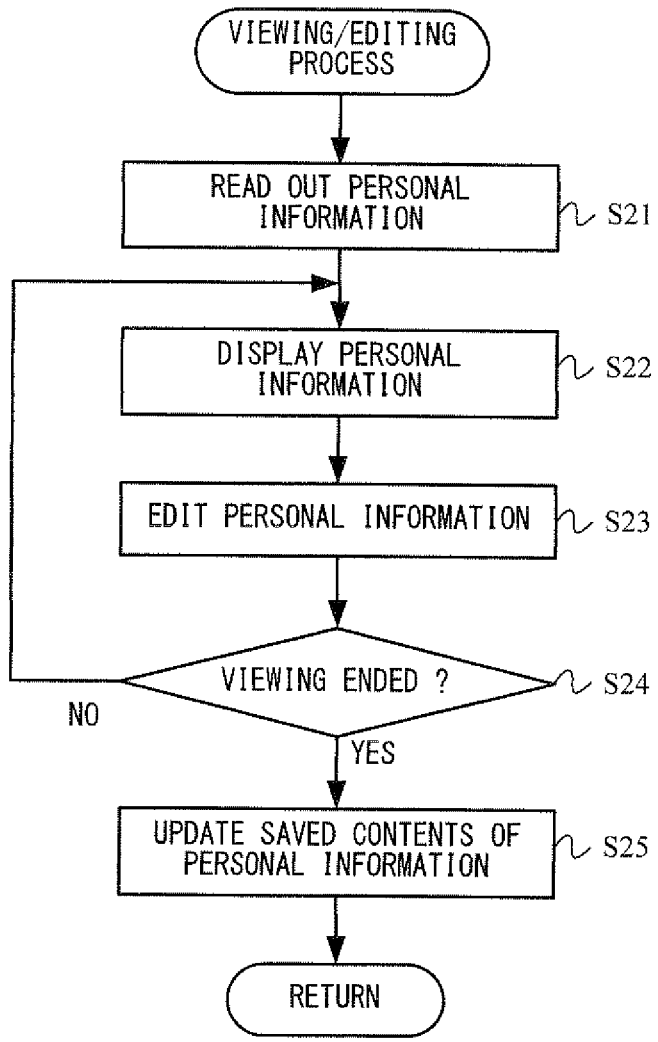
FIG. 6 is a flow chart showing the flow of a viewing/editing process (step S3) shown in FIG. 4.

FIG. 6 is a flow chart showing the flow of the viewing/editing process (step S3) shown in FIG. 4. In the viewing/editing process, first in step S21, the CPU 31 reads out personal information from the saved data memory 34. That is, the CPU 31 reads out the person-identifying data 53, the non-person-identifying data 54 and the authentication data 55 from the saved data memory 34, and stores them in the main memory 32. Following step S21, the process of step S22 is executed.

In step S22, the CPU 31 displays the personal information. That is, personal information represented by the person-identifying data 53 and the non-person-identifying data 54 stored in the main memory 32 is displayed on a lower LCD 12 and/or an upper LCD 22. Note that in step S22, it is not necessary that personal information (person-identifying information and non-person-identifying information) is displayed all at once, but only a predetermined portion of the personal information may be displayed. In the present embodiment, personal information is divided into a plurality of items, and information included in the item or items specified by the user is displayed on the LCD 12 and/or 22.

Figures 7, 8:
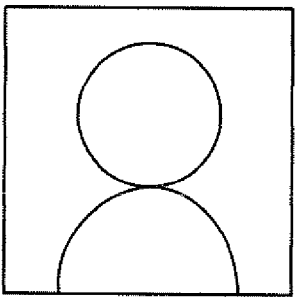
FIG. 7 shows an example of an item display screen displayed in step S21.
FIG. 8 shows an example of a personal information display screen.

FIG. 7 shows an example of an item display screen displayed in step S21. In the present embodiment, in step S21, first, the item display screen shown in FIG. 7 is displayed on the lower LCD 12. Displayed on the item display screen are items of "Basic information", "Record of medical history", "Record of medication history", "Record of infectious diseases/vaccination", "Record of human dry docks" and "Self examination". A sentence "Select item to be viewed/edited", prompting the user to specify an item, is also displayed. The user specifies one of the displayed items by the touch panel 13. Note that "Basic information" is an item for displaying the basic information registered in step S14 described above, "Record of medical history" is an item for displaying information regarding medical history described above, "Record of medication history" is an item for displaying information regarding medication history described above, "Record of infectious diseases/vaccination" is an item for displaying information regarding vaccination described above, and "Record of human dry docks" is an item for displaying information regarding human dry docks described above. The item "Self examination" is an item for allowing the user to summarize, before going to hospital, issues to be told to the doctor. When the item "Self examination" is selected, the CPU 31 prompts the user to input information to be told to the doctor in such a format that the user is asked to answer questions such as "What seems to be the problem?" and "Since when have you had the problem?", for example.

When an item is specified on the item display screen, the CPU 31 displays information included in the specified item (person-identifying information and non-person-identifying information) on the screen (e.g., the lower LCD 12). FIG. 8 shows an example of a personal information display screen. For example, when the item "Basic information" is specified, the CPU 31 displays the person-identifying information and various information included in the basic information registered in step S14 described above. That is, as shown in FIG. 8, the name and the face photograph are displayed as person-identifying information, and information regarding height, weight, waist, allergies, and drinking/smoking habit is displayed as non-person-identifying information. Therefore, the user can view the previously-registered physical information of the user. Note that in the present embodiment, information of the birth date (password), which is authentication information, is also displayed.

Note that in step S22 described above, the format and method of displaying the personal information may be any format and method, and the CPU 31 may display some items of information at a time as in the present embodiment, or may display all the information wherein the screen can be scrolled. The CPU 31 does not always need to display person-identifying information and non-person-identifying information at the same time. Following step S22 described above, the process of step S23 is executed.

In step S23, the CPU 31 edits (updates) the personal information according to instructions from the user. The format and method by which the personal information is edited may be any format and method. In the present embodiment, the personal information display screen is displayed in step S22 described above, and by specifying information from among various information displayed by the touch panel 13, etc., the user can perform an updating operation (including adding/changing/deleting) of the specified information. For example, when the item "Basic information" is specified, by specifying information from among various information shown in FIG. 8, the user can update the specified information. Note that when the personal information is updated in step S23, the CPU 31 updates the contents of the person-identifying data 53 and the non-person-identifying data 54 stored in the main memory 32. Note that in step S23 described above, only the process of updating the personal information has been described, but the user can update the authentication information as well as the personal information. Following step S23 described above, the process of step S24 is executed.

In step S24, the CPU 31 determines whether or not the viewing/editing of the personal information should be ended. The determination can be made by, for example, determining whether or not an instruction to end the viewing/editing of the personal information has been made by the user. The instruction to end the viewing/editing of the personal information may be made by, for example, pressing down a predetermined button of the game apparatus 1. Alternatively, for example, an image representing "End" may be displayed on the personal information display screen (FIG. 8), and the instruction may be made by specifying the image by the touch panel 13, etc. If the determination result of step S24 is affirmative, the process of step S25 is executed. On the other hand, if the determination result of step S24 is negative, the process of step S22 is executed again. Therefore, in this case, the item display screen (FIG. 7) is displayed again, and the process of steps S22 and S23 is thereafter repeated until the viewing/editing of the personal information is ended in step S24.

In step S25, the CPU 31 updates the personal information of the saved data memory 34. That is, the person-identifying data 53, the non-person-identifying data 54 and the authentication data 55 stored in the main memory 32 are stored in the saved data memory 34. Thus, the contents of the editing in step S23 described above are reflected on the personal information stored in the saved data memory 34. Note that while the contents of the saved data memory 34 are updated after the viewing/editing process is ended in the present embodiment, the point in time when the contents of the saved data memory 34 are updated may be any point in time, and the contents of the saved data memory 34 may be updated each time the personal information is changed in step S23, for example. After the end of step S25 described above, the CPU 31 ends the viewing/editing process.

As described above, in the present embodiment, if the start-up of the physical information management program 51 stored in the saved data memory 34 is the initial start-up, the viewing/editing process (step S3) is executed after the initial registration process (step S2) is executed. Therefore, after inputting person-identifying information and mandatory authentication information in the initial session, the user can successively input physical information. Note that while it is preferred that at least personal registration information and authentication information are registered upon initial start-up of the physical information management program 51, the process of registering non-person-identifying information (physical information) does not need to be executed upon initial start-up in other embodiments.

Now, referring back to FIG. 4, the process where the start-up of the physical information management program 51 is the second start-up or later (No in step S1) will be described. In step S4, the CPU 31 accepts the input of a password (birth date), which is authentication information, from the user. Specifically, the CPU 31 displays a message such as "Input your birth date", prompting for an input, and accepts the input of the birth date. Then, when the birth date is inputted, the inputted information is stored, and the process of step S5 is executed.

In step S5, the CPU 31 determines whether or not the authentication information registered in advance matches with the information inputted by the user in step S4. That is, the CPU 31 reads out the authentication data 55 stored in the saved data memory 34, and determines whether or not the authentication information represented by the authentication data 55 (the information of the birth date) matches with the information of the birth date inputted in step S4. If the determination result of step S5 is affirmative, the process of step S3 described above is executed. On the other hand, if the determination result of step S5 is negative, the process of step S6 is executed.

In step S6, the CPU 31 counts the number of times the authentication information did not match in step S5 (non-match count). In step S6, it counts the number of times the authentication information did not match since the start-up of the physical information management program 51. That is, the CPU 31 increments the counter value by one each time process hits step S6, if the determination result of step S1 is negative. Note that in the present embodiment, the counter value is stored in the main memory 32, and is reset to "0" upon power-on of the game apparatus 1. In other embodiments, however, the counter value may be stored as save data. That is, the counter value may be stored in the saved data memory 34 or the memory card 28 or 29. Where the counter value is stored as save data, the counter value may be carried over even after the power of the game apparatus 1 is turned OFF. That is, the counter value may not be reset to "0" upon power-on of the CPU 31, but may be reset when authentication succeeds or when the initial registration process is executed in step S9 to be described later. Following step S6, the process of step S7 is executed.

In step S7, the CPU 31 determines whether or not authentication has failed, i.e., whether or not the non-match count has reached a predetermined count. Specifically, the CPU 31 determines whether or not the counter value has become equal to a predetermined value (e.g., "3"). If the determination result of step S7 is negative, the process of step S4 is executed again. That is, where the non-match count has not reached the predetermined count, one is allowed to re-input a password (birth date). On the other hand, where the determination result of step S7 is affirmative, the process of step S8 is executed.

Note that in other embodiments, the CPU 31 may warn the user before the counter value becomes equal to the predetermined value. For example, when the counter value becomes smaller than the predetermined value by one, the CPU 31 may display a message such as "If you enter invalid password one more time, your name and other information will be erased".

In step S8, the CPU 31 erases the person-identifying information and the authentication information, among the personal information stored in the saved data memory 34. That is, the person-identifying data 53 and the authentication data 55 stored in the saved data memory 34 are erased. Note that the person-identifying data 53 and the authentication data 55 may be stored in the main memory 32 in the game apparatus 1 at the point of step S8 (for example, if the determination result of step S1 described above is negative, the CPU 31 may load the personal information data in the saved data memory 34 onto the main memory 32 before the process of step S4). Then, in step S8, the person-identifying data 53 and the authentication data 55 stored in the main memory 32 are erased as well as the saved data memory 34. Following step S8 described above, the process of step S9 is executed.

As described above, in the present embodiment, user authentication is performed in the process of steps S5 to S7, and if authentication succeeds (Yes in step S5), the personal information viewing/editing process (step S3) is executed. On the other hand, if authentication fails (No in step S7), the person-identifying information, among the personal information, is erased.

In step S9, the CPU 31 executes an initial registration process similar to that of step S2. That is, by the process of step S9, the person-identifying information, the authentication information and the basic information are re-registered. Note that in other embodiments, in step S9, the basic information, which is non-person-identifying information, does not need to be registered. By the process of step S9, in the present embodiment, the user can re-input person-identifying information when authentication fails. That is, in a case where a valid user fails in authentication for reasons such as forgetting the password, the valid user can re-input person-identifying information.

Following step S9 described above, the process of step S3 described above is executed. In step S3, the person-identifying information (in this case, information re-registered in step S9 described above) and the non-person-identifying information are viewed/edited, as described above. Therefore, in the present embodiment, even in a case where a user fails in authentication for reasons such as forgetting the password, the user can use the application by re-inputting person-identifying information. After the end of the process of step S3, the CPU 31 ends the process shown in FIG. 4. Note that in other embodiments, when authentication fails, the process may be ended without executing the process of steps S9 and S3 after step S8 in order to prevent an invalid user from using the information management program.

As described above, in the present embodiment, the viewing/editing process of step S3 is executed even when user authentication fails, and therefore even a user who has failed in authentication can view the non-person-identifying information. Herein, it is speculated that a case where user authentication fails would be either a case (a) where an invalid user has started up the physical information management program 51 or a case (b) where a valid user has forgotten or erroneously inputted the password. In the case (a) above, the invalid user is allowed to view non-person-identifying information of a valid user. However, in the present embodiment, the person-identifying information has been erased in step S8 (different person-identifying information has been registered in step S9 following step S8). Therefore, the invalid user viewing the non-person-identifying information cannot identify the person, i.e., of whom the non-person-identifying information is. For example, in a case where the information shown in FIG. 8 is seen by a third person, it will be possible to identify of whom the non-person-identifying information is because the person-identifying information (name) and the non-person-identifying information (height/weight, etc.) are present as a set. On the other hand, even if only information of height or weight is seen by a third person, it will not pose a problem since it will not be possible to identify of whom the information is. Therefore, in the present embodiment, since personal information becoming known to a third person will not pose a problem, it is possible to appropriately manage the personal information.

In the case (b) above, the valid user can view/edit the non-person-identifying information inputted in the past by inputting part of the information such as person-identifying information in step S9. That is, while a valid user needs to re-register part of the information including person-identifying information, the valid user does not basically need to re-register non-person-identifying information. Therefore, since the user does not need to perform a time-consuming re-input operation, the user can readily use the personal information. Particularly, where physical information including medical history and medication history is managed as non-person-identifying information, as is in the present embodiment, the present invention is particularly useful because it is possible that the user himself/herself may not remember all the information and it may be very difficult to re-input the information.

As described above, according to the present embodiment, it is possible to prevent the problem of personal information becoming known to a third person (in the case (a) above), while a valid user can readily use the personal information (in the case (b) above). That is, it is possible to provide an information processing program that is safe and has a high usability.

Other Embodiments

The embodiment above is an example of how the present invention is carried out, and the present invention can be carried out with, for example, configurations to be described below in other embodiments.

(Variation Regarding Method for Prohibiting Display of Person-Identifying Information)

In the embodiment above, when user authentication fails, the game apparatus 1 prohibits the display (viewing) of person-identifying information by erasing person-identifying data. Herein, in other embodiments, the game apparatus 1 does not always need to erase the data as long as it is possible to prohibit the display of person-identifying information. For example, when authentication fails, the game apparatus 1 may selectively blank out the person-identifying information such as the name and the face photograph on the personal information display screen shown in FIG. 8.

(Variation Regarding Other Types of Personal Information)

While the embodiment above has been described with respect to an example where the physical information of the user (person) is managed as non-person-identifying information, the contents of non-person-identifying information are not limited thereto. For example, in other embodiments, the information processing program may manage, as non-person-identifying information, information regarding the assets of the user (specifically, information of bankbook, household accounts book, property, income, etc.) or information of schedule. Therefore, the present invention can be applied to household accounts book applications and schedule management applications. Moreover, in addition to those described above, the object to be managed as non-person-identifying information may be information regarding the personal history of the user (specifically, information of vocational history, educational history, medical history, diary, grades, etc.), information regarding the occupation of the user (specifically, information of salary, vocational history, etc.), information regarding the likings of the user (specifically, information of hobbies, regular stores, etc.), etc.

(Variation Regarding Multiple Users)

While the embodiment above has been described with respect to an example where the physical information management program 51 is used by a single user, the physical information management program 51 may be used by a plurality of users in other embodiments. For example, the game apparatus 1 may require each user to register identification information (ID) along with a password, and may require the user to input the identification information before accepting the input of the password. Note that the identification information may be a simple character string or the nickname of each user, but is not preferably person-identifying information such as the name of the user. The game apparatus 1 performs authentication using a password that is associated with the inputted identification information. Moreover, the game apparatus 1 has a password or identification information associated with personal information, and when authentication succeeds for a user of certain identification information, the game apparatus 1 allows only the personal information associated with that user to be displayed. On the other hand, if authentication fails for a user of certain identification information, the game apparatus 1 may erase person-identifying information associated with that user or may erase person-identifying information of all users.

The game apparatus 1 may use non-person-identifying information as identification information. That is, after the physical information management program 51 is started up, the game apparatus 1 displays (part of) the non-person-identifying information for each user, and has the user select non-person-identifying information. The game apparatus 1 performs authentication using a password that is associated with the selected non-person-identifying information. Then, the user does not separately input identification information and it is not necessary to store identification information, thus providing an application with a higher usability.

(Variation Using Communication Network)

While the embodiment above has been described with respect to an example where various processes of the present invention are executed by a single unit (the game apparatus 1), the present invention may be implemented as an information processing system including a plurality of units that can communicate with one another via a communication network such as the Internet. For example, one or more of the functions of the game apparatus 1 of the embodiment above may be assigned to a server unit that is connected to the game apparatus 1 via a communication network.

Specifically, a server unit may include means for storing personal information (corresponding to the saved data memory 34 in the embodiment above), and a terminal unit (the game apparatus 1) may receive personal information from the server unit at an appropriate point in time. For example, the terminal unit may receive personal information from the server unit at a point in time when user authentication succeeds, or may receive information to be displayed from the server unit at a point in time when the information is displayed. Alternatively, only the person-identifying information may be stored in the server unit with the non-person-identifying information stored in the terminal unit, or only the non-person-identifying information may be stored in the server unit with the person-identifying information stored in the terminal unit. Also with such a configuration, it is possible to obtain effects similar to those of the embodiment above.

The server unit may include means for storing authentication information and means for executing an authentication process using the authentication information (steps S5 to S7), as well as the means for storing personal information (or instead of the means for storing personal information). Then, as the terminal unit accepts a password from the user, the terminal unit transmits the received password to the server unit. The server unit performs an authentication process using the password transmitted from the terminal unit and the pre-stored authentication information. The function of prohibiting the display of person-identifying information may be provided on the terminal side or on the server unit side. For example, the server unit may transmit the authentication result to the terminal unit, and the terminal unit may prohibit, on the terminal side, the display of the person-identifying information by not displaying the person-identifying information when authentication has failed. For example, where personal information is stored on the server unit side, the display of the person-identifying information on the terminal side may be prohibited on the server unit side by transmitting person-identifying information to the terminal unit only when authentication has succeeded (not transmitting the person-identifying information to the terminal unit when authentication has failed). Also with such a configuration, it is possible to obtain effects similar to those of the embodiment above. By storing the personal information or the authentication information on the server unit side, or by providing the authentication process function and/or the function of prohibiting the display of person-identifying information on the server unit side, it is possible to reduce the storage capacity to be required on the terminal unit side or the computational load on the terminal unit.

As described above, the present invention is applicable to an application program, for example, for managing physical information, etc., aiming at, for example, eliminating the need for the user to perform a time-consuming re-input operation even in a case where the user fails in authentication.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium storing therein an information processing program executed by a computer of an information processing apparatus for displaying, on a display device, personal information including person-identifying information based on which a person can be identified and the personal information including non-person-identifying information based on which a person cannot be identified, the program instructing the computer to execute instructions comprising:
  determining whether or not authentication of a user has succeeded based on an input by the user and authentication information stored in a storage device accessible from the computer; and
  prohibiting display of the person-identifying information of the personal information stored in the storage device when it is determined that authentication has failed,
  wherein display of the person-identifying information is prohibited by erasing the person-identifying information, which is personal information in which a person can be substantially identified when the personal information is used solely, or personal information in which a person can be substantially identified when one item of personal information is used in combination with another item of personal information, from the storage device while retaining the non-person-identifying information of the personal information on which the person cannot be substantially identified, when it is determined that authentication has failed.

2. The non-transitory storage medium according to claim 1, wherein the information processing program instructs the computer to further execute instructions comprising accepting an input of new person-identifying information and storing the new person-identifying information in the storage device, when it is determined that authentication has failed.

3. The non-transitory storage medium according to claim 2, wherein the authentication information is erased from the storage device, when it is determined that authentication has failed.

4. The non-transitory storage medium according to claim 3, wherein an input of new authentication information is accepted and stored in the storage means, when it is determined that authentication has failed.

5. The non-transitory storage medium according to claim 2, wherein the information processing program instructs the computer to further execute instructions comprising displaying the new person-identifying information and the non-person-identifying information, when the new person-identifying information is stored in the storage device.

6. The non-transitory storage medium according to claim 1, wherein the information processing program instructs the computer to further execute instructions comprising having the user input the person-identifying information and the authentication information at an initial start-up of the information processing program and storing the inputted person-identifying information and the inputted authentication information in the storage device.

7. The non-transitory storage medium according to claim 6, wherein:
  the information processing program instructs the computer to further execute instructions comprising:
  accepting an input of authentication information when the information processing program is started up after person-identifying information and authentication information are stored in the storage device; and
  determining whether or not authentication has succeeded based on the accepted authentication information and the authentication information stored in the storage device.

8. The non-transitory storage medium according to claim 1, wherein the information processing program instructs the computer to further execute instructions comprising editing non-person-identifying information stored in the storage device when it is determined that authentication has succeeded.

9. The non-transitory storage medium according to claim 1, wherein the information processing program instructs the computer to further execute instructions comprising displaying person-identifying information and non-person-identifying information stored in the storage device when it is determined that authentication has succeeded.

10. The non-transitory storage medium according to claim 1, wherein the person-identifying information includes at least one of a name, a face, a photograph, an address, an email address, a license number, and/or a health insurance number.

11. An information processing apparatus for displaying, on a display device, personal information including person-identifying information based on which a person can be identified and the personal information including non-person-identifying information based on which a person cannot be identified, comprising:
  an authentication determination unit for determining whether or not authentication of a user has succeeded based on an input by the user and authentication information stored in a storage device accessible from the information processing apparatus; and
  an information control unit for prohibiting display of the person-identifying information of the personal information stored in the storage device when it is determined by the authentication determination unit that authentication has failed,
  wherein display of the person-identifying information is prohibited by erasing the person-identifying information, which is personal information in which a person can be substantially identified when the personal information is used solely, or personal information in which a person can be substantially identified when one item of personal information is used in combination with another item of personal information, from the storage device while retaining the non-person-identifying information of the personal information on which the person cannot be substantially identified, when it is determined that authentication has failed.

12. An information processing system, comprising a terminal unit for displaying, on a display device, personal information including person-identifying information based on which a person can be identified and the personal information including non-person-identifying information based on which a person cannot be identified, and a server unit that can communicate with the terminal unit via a network, comprising:
  a personal information storing unit for storing the personal information;
  an authentication information storing unit for storing authentication information;
  an authentication determination unit for determining whether or not authentication of a user has succeeded based on an input by the user and the authentication information; and
  an information control unit for prohibiting display of the person-identifying information of the personal information stored in the personal information storing unit when it is determined by the authentication determination unit that authentication has failed,
  wherein display of the person-identifying information is prohibited by erasing the person-identifying information, which is personally information in which a person can be substantially identified when the personal information is used solely, or personal information in which a person can be substantially identified when one item of personal information is used in combination with another item of personal information, from the storage device while retaining the non-person-identifying information of the personal information on which the person cannot be substantially identified, when it is determined that authentication has failed.

13. A method for displaying, on a display device, personal information including person-identifying information based on which a person can be identified and the personal information including non-person-identifying information based on which a person cannot be identified, the method being implemented by an information processing apparatus having one or more processors, the method comprising:

determining, via the one or more processors, whether or not authentication of a user has succeeded based on an input by the user and authentication information stored in a storage device accessible from the computer; and prohibiting display of the person-identifying information of the personal information stored in the storage device when it is determined that authentication has failed, wherein display of the person-identifying information is prohibited by erasing the person-identifying information, which is personal information in which a person can be substantially identified when the personal information is used solely, or personal information in which a person can be substantially identified when one item of personal information is used in combination with another item of personal information, from the storage device while retaining the non-person-identifying information of the personal information on which the person cannot be substantially identified, when it is determined that authentication has failed.

* * * * *